United States Patent
Mozurkewich et al.

(10) Patent No.: US 10,336,262 B2
(45) Date of Patent: Jul. 2, 2019

(54) UNDER SEAT STORAGE BIN FOR FLIP FORWARD SECOND ROW SEAT

(71) Applicant: FORD GLOBAL TECHNOLOGIES, LLC, Dearborn, MI (US)

(72) Inventors: Kevin Mozurkewich, Livonia, MI (US); Murtatha Zalzala, Dearborn, MI (US); Nicholas Salenbien, Dundee, MI (US); Ammeswara Rao Sajja, Canton, MI (US); Ken Liao, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 45 days.

(21) Appl. No.: 15/489,793

(22) Filed: Apr. 18, 2017

(65) Prior Publication Data

US 2018/0297533 A1 Oct. 18, 2018

(51) Int. Cl.
| A47C 7/62 | (2006.01) |
| B60R 7/04 | (2006.01) |
| B60N 2/427 | (2006.01) |
| B60N 2/30 | (2006.01) |

(52) U.S. Cl.
CPC .............. B60R 7/043 (2013.01); B60N 2/305 (2013.01); B60N 2/3013 (2013.01); B60N 2/42763 (2013.01)

(58) Field of Classification Search
CPC ......... B60R 7/043; B60R 22/26; B60N 2/305; B60N 2205/30; B60N 2/68; B64D 11/0636
See application file for complete search history.

(56) References Cited

U.S. PATENT DOCUMENTS

| 5,249,724 | A | * | 10/1993 | Green | B60R 7/043 220/771 |
| 5,558,386 | A | * | 9/1996 | Tilly | B60N 2/305 292/111 |
| 5,575,533 | A | * | 11/1996 | Glance | B60N 2/682 297/232 |
| 5,622,404 | A | | 4/1997 | Menne | |
| 5,816,650 | A | | 10/1998 | Lucas, Jr. | |
| 5,902,009 | A | * | 5/1999 | Singh | B60N 2/90 297/188.1 |
| 5,988,748 | A | * | 11/1999 | Morrison | B60N 2/0232 297/328 |
| 6,419,313 | B1 | | 4/2002 | Newman | |
| 6,877,807 | B2 | | 4/2005 | Mizuno et al. | |
| 7,121,606 | B2 | | 10/2006 | Khan et al. | |
| 7,523,985 | B2 | * | 4/2009 | Bhatia | B60N 2/206 297/188.04 |
| 9,016,778 | B2 | * | 4/2015 | Hellman | A47O 4/54 297/188.09 |

(Continued)

*Primary Examiner* — Shin H Kim
(74) *Attorney, Agent, or Firm* — Vichit Chea; Price Heneveld LLP

(57) ABSTRACT

A seating assembly comprises a lower seating assembly having a lower surface displaced above a floor pan, a mounting bracket operably coupling a forward edge of the lower seating assembly to the floor pan, and a storage bin comprising a horizontally disposed frame member disposed between the lower surface and the floor pan, wherein the storage bin, the floor pan, and the lower surface define an enclosure below the lower seating assembly.

17 Claims, 9 Drawing Sheets

(56) References Cited

U.S. PATENT DOCUMENTS

| | | | | |
|---|---|---|---|---|
| 9,090,209 B2* | 7/2015 | Aguirre | ............... | B60R 7/043 |
| 9,421,915 B2* | 8/2016 | Kalergis | ............... | B60R 7/043 |
| 9,776,573 B2* | 10/2017 | Wiley | ............... | B60R 7/043 |
| 9,896,010 B2* | 2/2018 | Berno | ............... | B60N 3/002 |
| 2002/0005649 A1* | 1/2002 | Hofmann | ............... | B60R 7/043 |
| | | | | 296/37.15 |
| 2016/0129845 A1* | 5/2016 | Kalergis | ............... | B60R 7/043 |
| | | | | 297/188.1 |

* cited by examiner

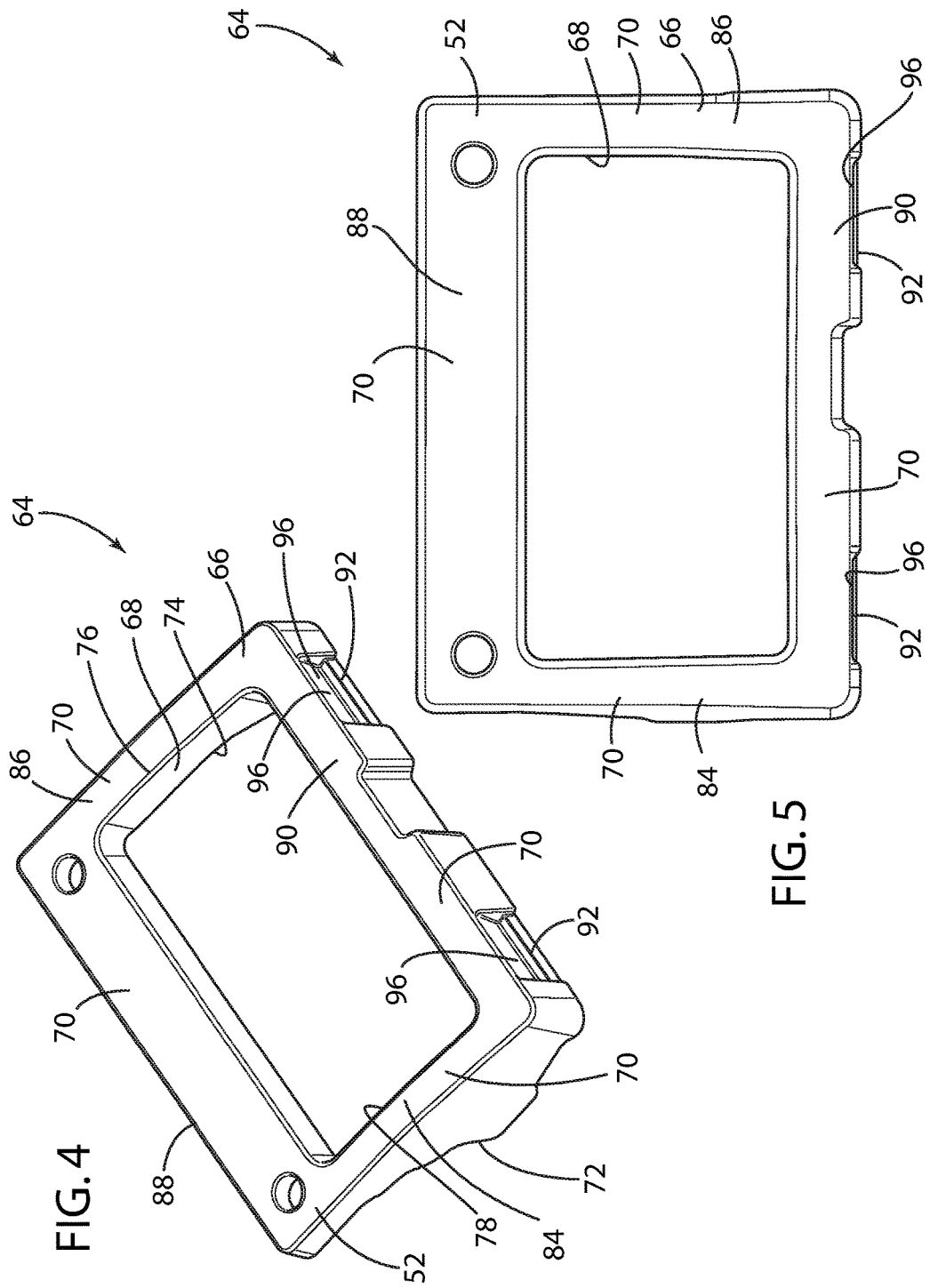

UNDER SEAT STORAGE BIN FOR FLIP FORWARD SECOND ROW SEAT

FIELD OF THE INVENTION

The present invention generally relates to a device to improve the efficiency of and increase the storage opportunities in smaller motor vehicles and, more particularly, a single-piece storage bin disposed below a flip forward second row seat.

BACKGROUND OF THE INVENTION

Motor vehicle seating assemblies, particularly those used in the second and third row seating positions, often employ a lower seating assembly that flips forward about a forward pivot from a design position to a stowed position, whereby a seatback assembly on the seating assembly may be pivoted forward, such that the forward exposed surface of the seatback assembly is facing the floor pan of the motor vehicle and the rearward exposed surface forms an extended cargo area. Particularly in the case of smaller motor vehicles, which tend to endure compromised storage space due to the overall size of the motor vehicle, it is desirable to use all available space in motor vehicles to provide storage space. Seating assemblies that increase such usable space are desired.

SUMMARY OF THE INVENTION

According to one aspect of the present disclosure, a seating assembly comprises a lower seating assembly having a lower surface displaced above a floor pan, a mounting bracket operably coupling a forward edge of the lower seating assembly to the floor pan, and a storage bin comprising a horizontally disposed frame member disposed between the lower surface and the floor pan, wherein the storage bin, the floor pan, and the lower surface defines an enclosure below the lower seating assembly.

Embodiments of the first aspect of the disclosure can include any one or a combination of the following features:
- a storage bin comprising vertically extending sides that defines a lower edge that conforms to the floor pan and define a lower periphery and that defines a lower edge that conforms to the lower surface of the lower seating assembly and define an upper periphery;
- a storage bin comprising a lower opening and an upper opening that defines an enclosure within a volume between the lower surface and the floor pan;
- a frame member comprising two laterally opposed sides contoured to an underbody profile of the floor pan to conform with the floor pan;
- a lower seating assembly having a design position and a stowed position, the lower seating assembly forming a lid for the storage bin when in the design position;
- a frame member comprising an expanded polypropylene injection molded single-piece structure having a front edge further comprising an antisubmarine load reaction surface;
- an antisubmarine reaction surface comprising a reinforcement brace comprising a substantially elongated metal strip integrally molded into the injection molded single-piece structure;
- a mounting bracket comprising an upper pivot bracket operably coupled to a forward edge of the lower surface of the lower seating assembly and a lower pivot bracket operably coupled with the reinforcement brace by which the lower seating assembly is mounted to the floor pan;
- a storage bin forming an enclosure within an interior of the storage bin between the lower surface of the lower seating assembly and the floor pan when the lower seating assembly is in the design position;
- a lower seating assembly having a lower surface and a floor pan displaced one from another at irregular distances between a lower periphery and an upper periphery, and the sides of the storage bin substantially enclose the interior of the storage bin when the lower seating assembly is in the design position;
- a storage bin fabricated as an expanded polypropylene injection molded single-piece structure;
- a storage bin having a forward edge that defines an antisubmarine reaction surface;
- a storage bin having a rearward edge of the storage bin that creates an interference fit with a seatback mounting bracket;
- an antisubmarine reaction surface comprising a reinforcement brace fabricated as a substantially elongated metal strip integrally molded into the injection molded single-piece structure;
- a lower seating assembly comprising an upper pivot bracket operably coupled to a forward edge of the lower surface of the lower seating assembly and a lower pivot bracket operably coupled with the reinforcement brace by which the lower seating assembly is mounted to the floor pan; and
- a seating assembly comprising a second row seating assembly.

According to another aspect of the present disclosure, a seating assembly comprises a lower seating assembly having a design position and a stowed position mounted to a floor pan of a motor vehicle. The lower seating assembly further comprises an upper exposed surface and a lower surface, the lower surface being displaced above the floor pan when in the design position, and a mounting bracket operably coupled to the floor pan and pivotally attached to a forward edge of the lower seating assembly, whereby the lower seating assembly is pivotable about the mounting bracket between the design position and the stowed position. A storage bin is disposed between the lower surface of the lower seating assembly and the floor pan, the storage bin comprising a horizontally disposed frame member having vertically extending sides that have a lower edge that conforms to the floor pan and define a lower periphery and that define an upper edge that conforms to the lower surface of the lower seating assembly and define an upper periphery, wherein the storage bin, the floor pan, and the lower surface of the lower seating assembly define an enclosure below the lower seating assembly when the lower seating assembly is in the design position.

According to a further aspect of the present disclosure, a storage bin is disposed between a lower surface of a lower seating assembly and a floor pan of a motor vehicle. The storage bin comprises a horizontally disposed frame member having vertically extending sides that define a lower edge that conforms to the floor pan and define a lower periphery and that have an upper edge that conforms to the lower surface of the lower seating assembly and define an upper periphery, wherein the storage bin, the floor pan, and the lower surface of the lower seating assembly define an enclosure below the lower seating assembly when the lower seating assembly is in a design position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a front side perspective view of the storage bin in accordance with the present disclosure;

FIG. 5 is a top view of the storage bin of FIG. 4 in accordance with the present disclosure;

DETAILED DESCRIPTION OF THE PREFERRED EMBODIMENTS

Figure 1:
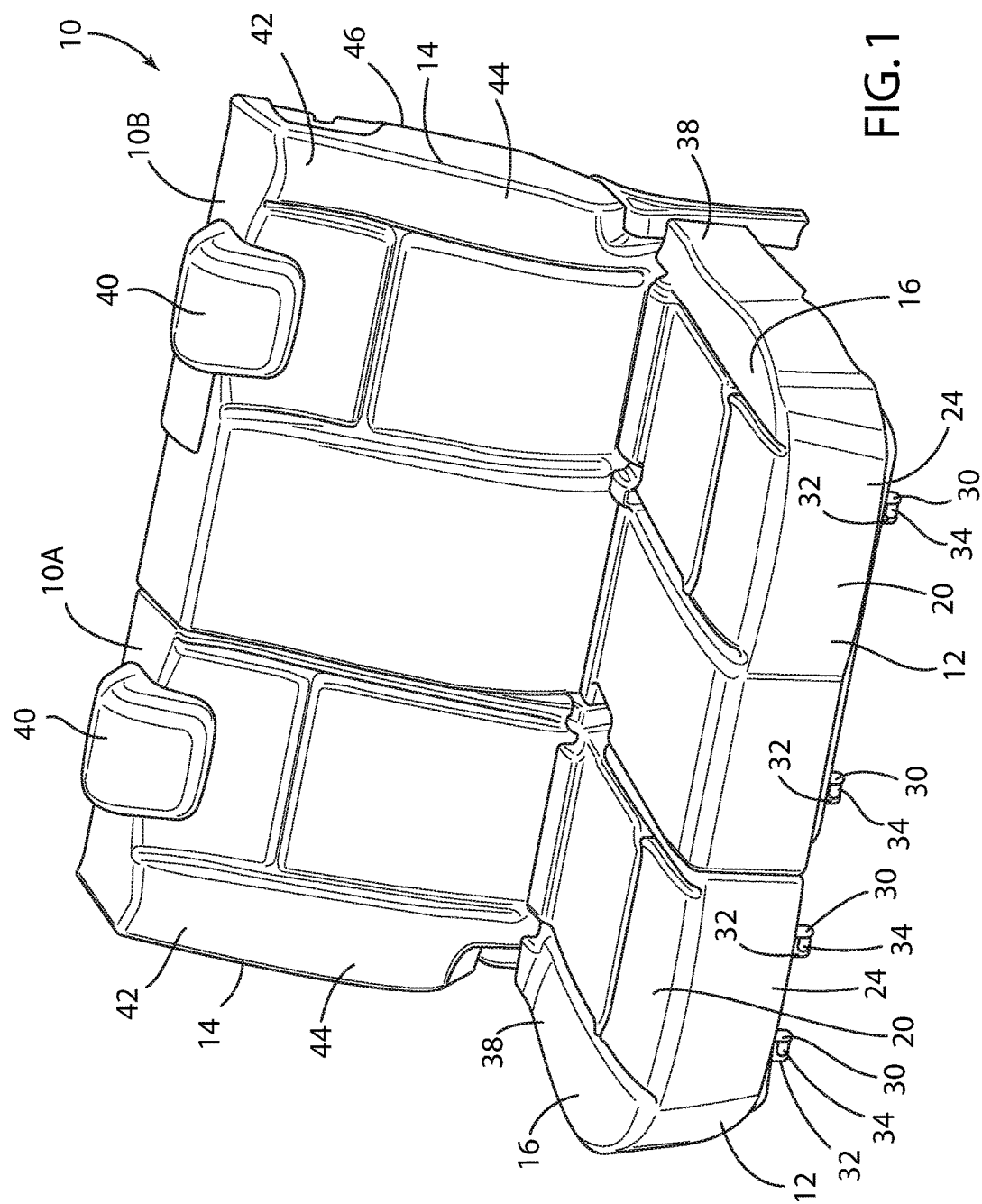
FIG. 1 is a front side perspective view of a motor vehicle seating assembly in accordance with the present disclosure, wherein the lower seating assembly of the motor vehicle assembly is in the design position and the seatback assembly is in the upright position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
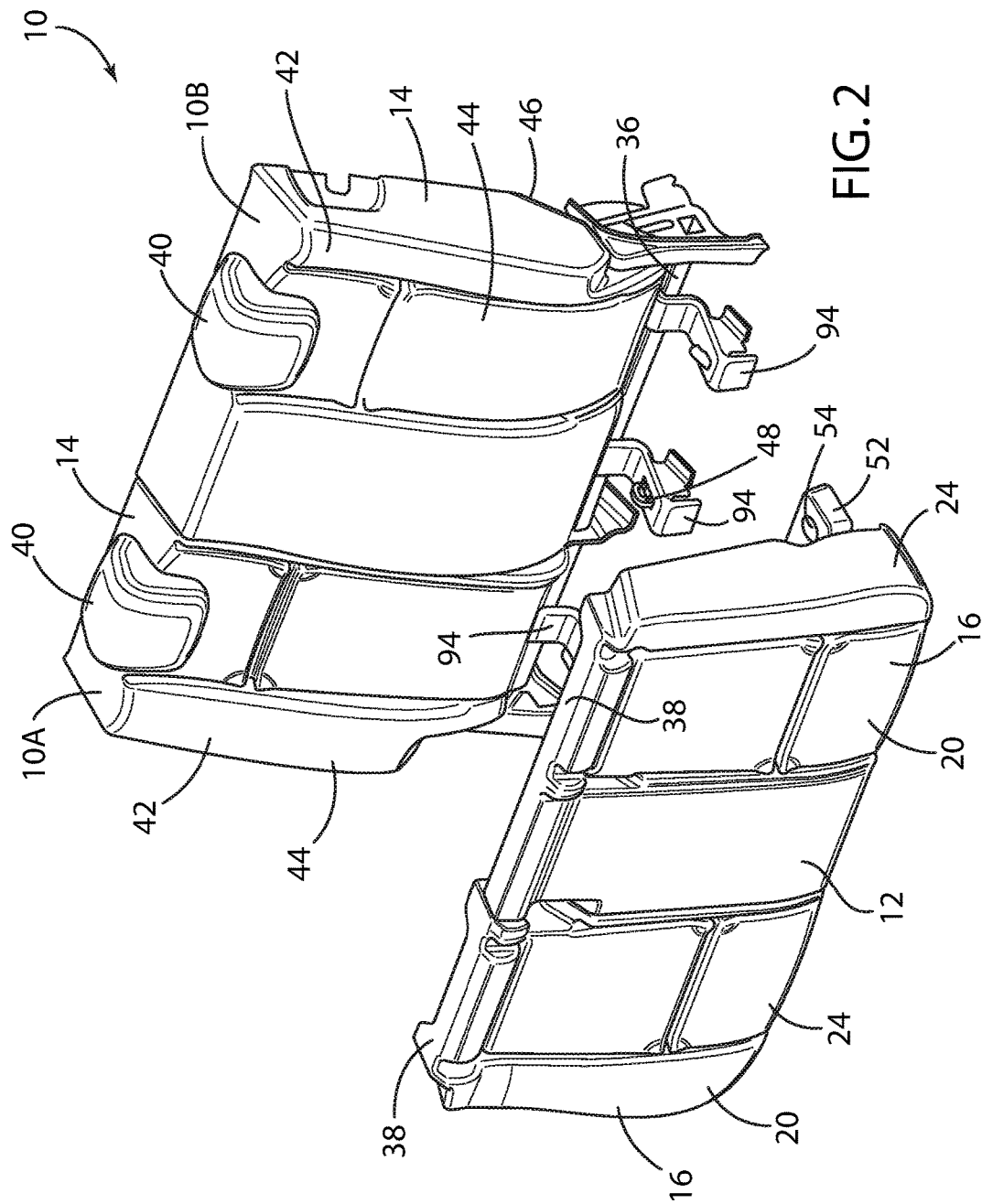
FIG. 2 is a front side perspective view of the motor vehicle seating assembly of FIG. 1, wherein the lower seating assembly of the motor vehicle seating assembly is "flipped forward" or pivoted forward to the stowed position.
Figure 3:
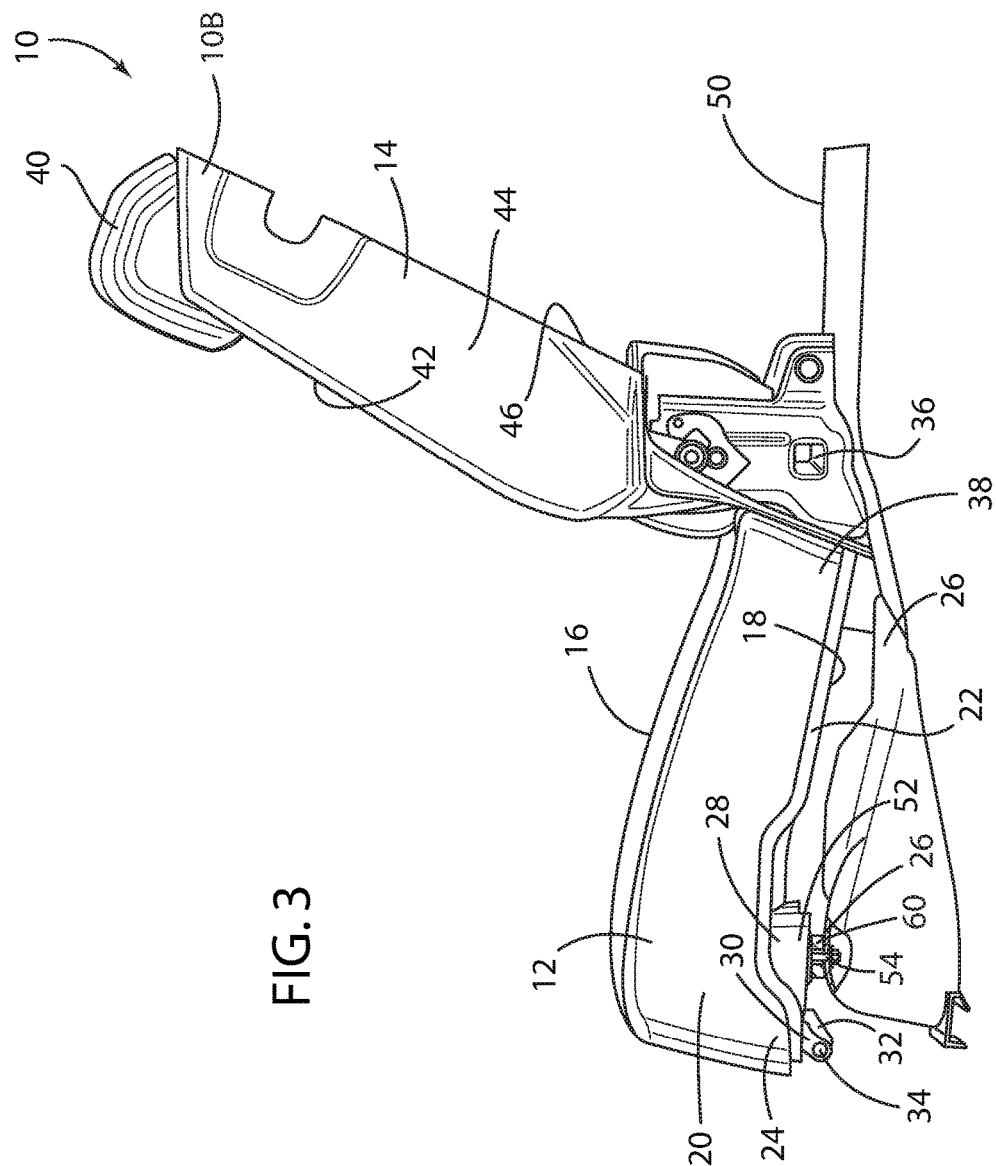
FIG. 3 is a side view of the motor vehicle seating assembly of FIG. 1, wherein the seatback assembly of the motor vehicle seating assembly is in the upright position.
Figure 6:
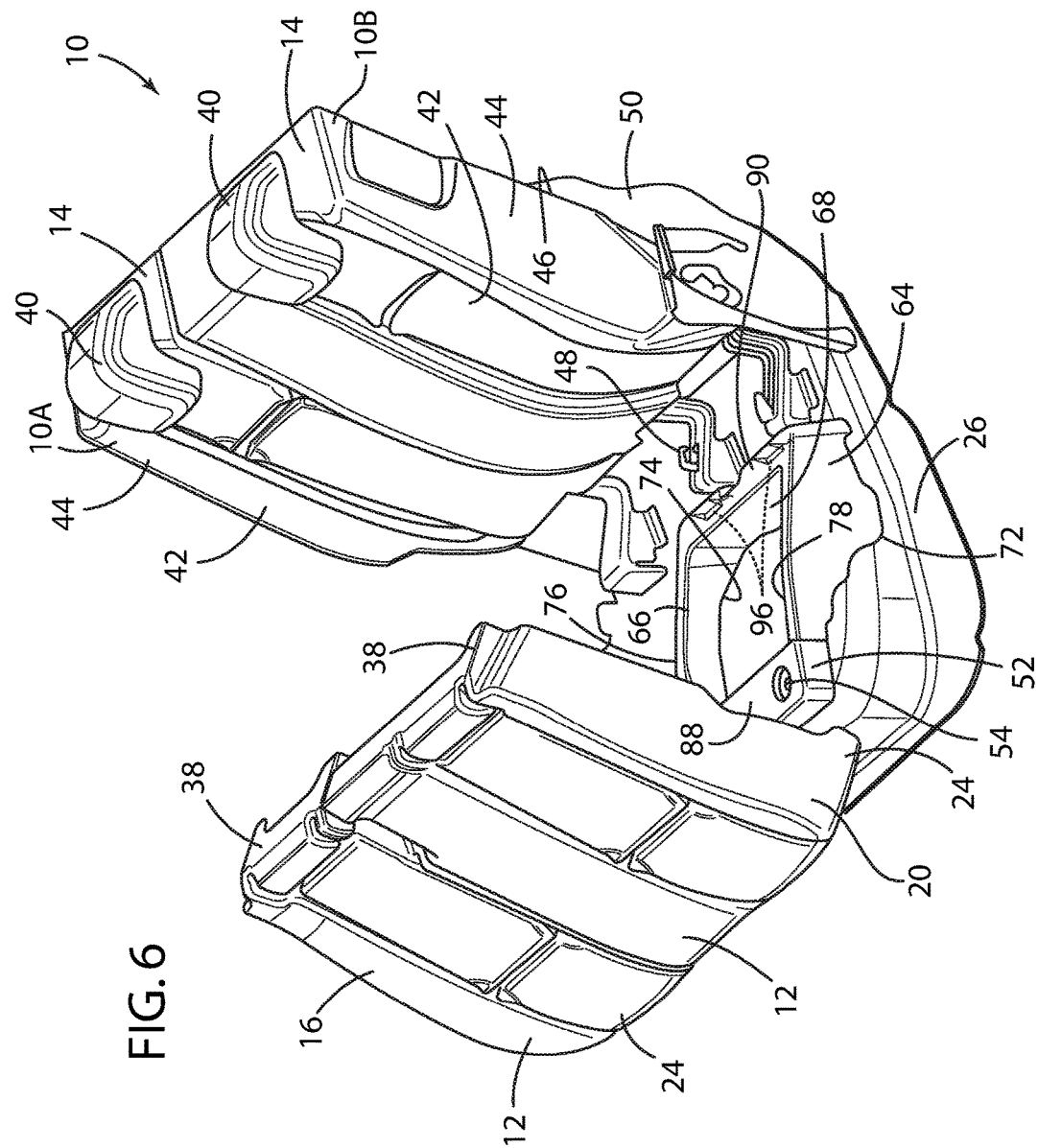
FIG. 6 is a front side perspective view of the motor vehicle seating assembly of FIG. 1 in accordance with the present disclosure, wherein the lower seating assembly of the motor vehicle seating assembly is pivoted forward to the stowed position to expose the interior of the storage bin of FIG. 4, and the seatback assembly is in the upright position.
Figure 7:
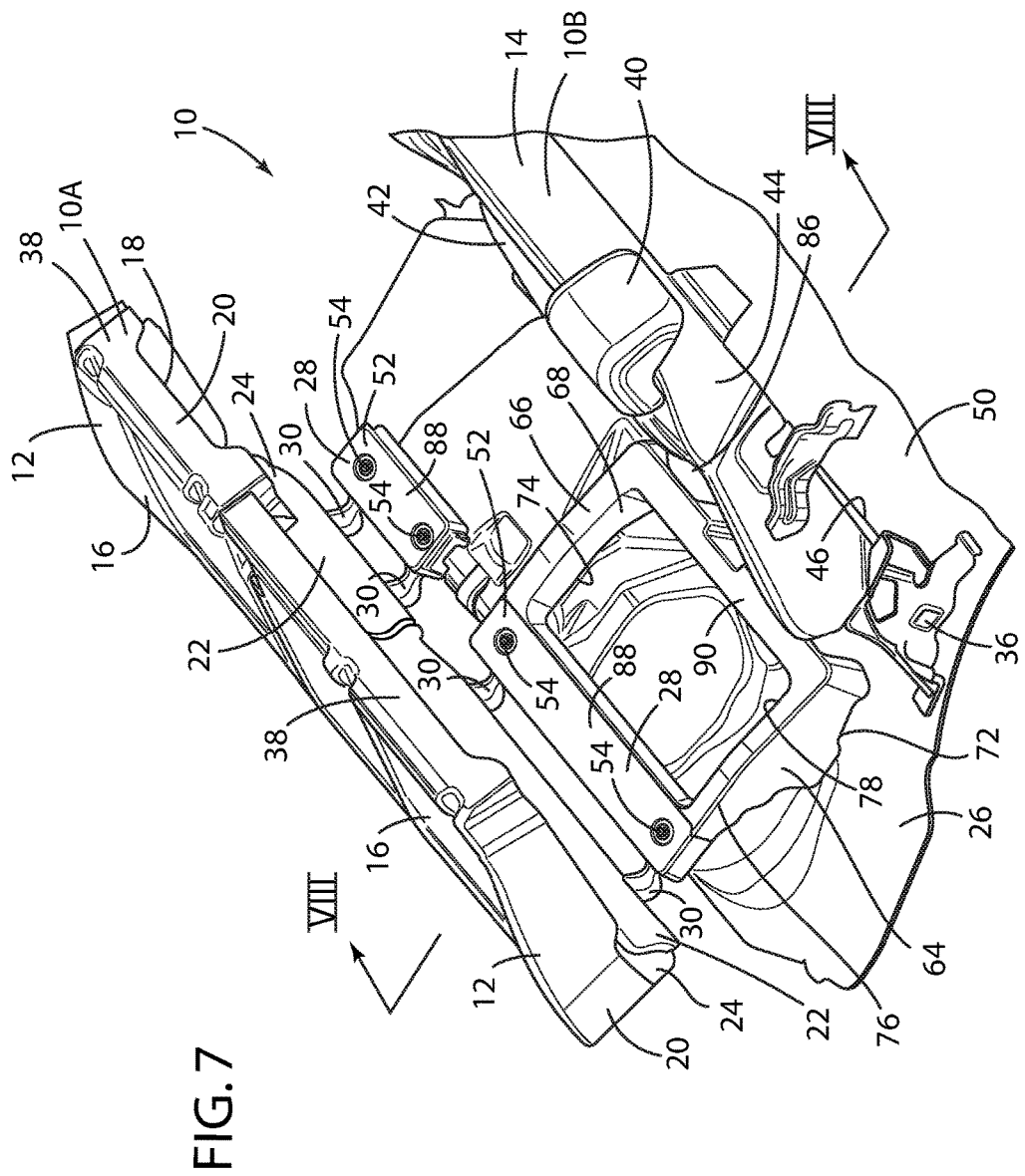
FIG. 7 is a rear side perspective view of the motor vehicle seating assembly in of FIG. 1 accordance with the present disclosure, wherein the lower seating assembly of the front seating assembly is pivoted forward to the stowed position to expose the interior of the storage bin of FIG. 4, and the seatback assembly is in the upright position.
Figure 8:
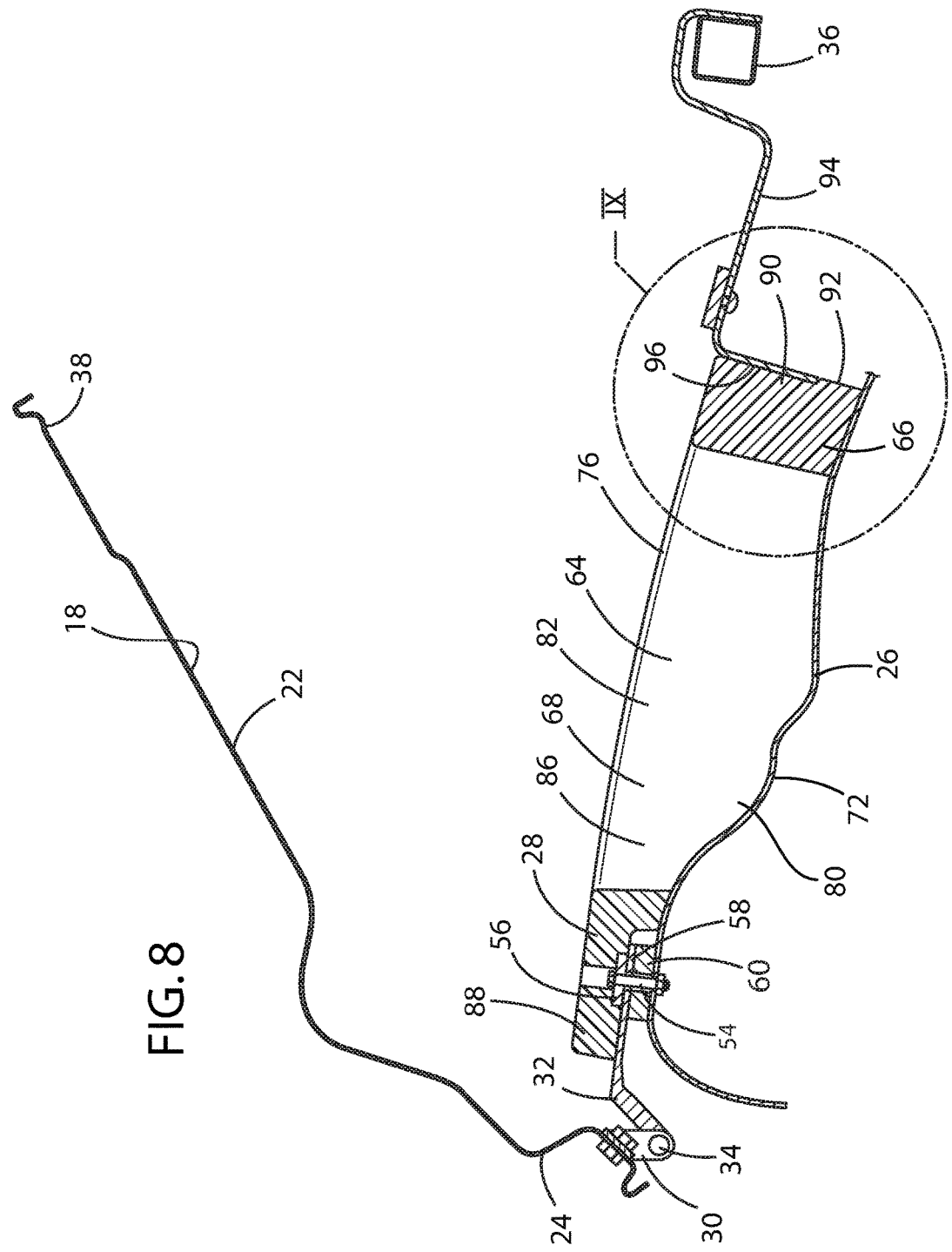
FIG. 8 is a side cross-sectional view of the lower seating assembly of the motor vehicle seating assembly of FIG. 1, the floor pan, and the storage bin of FIG. 4 in accordance with the present disclosure taken along the line VIII-VIII in FIG. 7.
Figure 9:
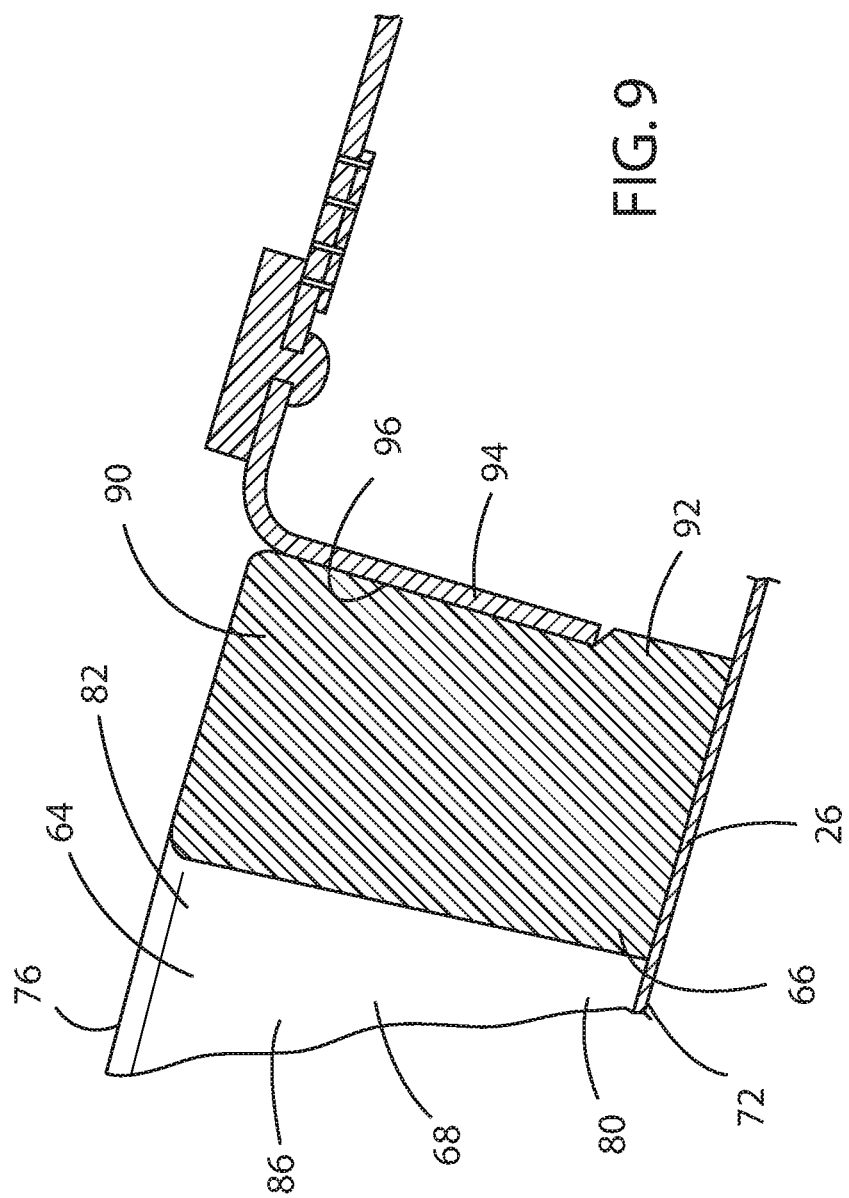
FIG. 9 is in enlarged side cross-sectional view of the floor pan and the storage bin of FIG. 4 in accordance with the present disclosure of FIG. 8.
Figure 10:
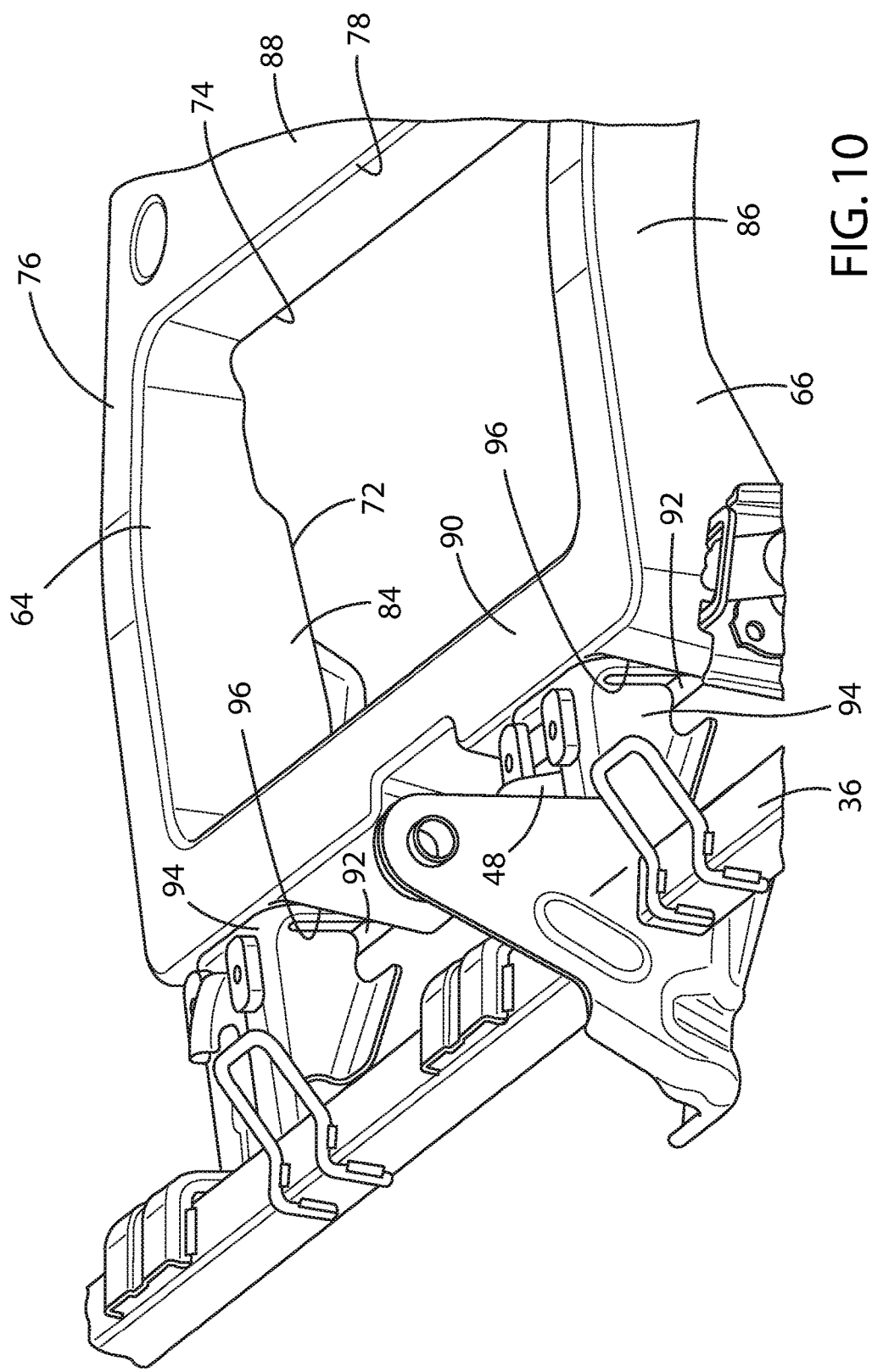
FIG. 10 is a rear side perspective view of the motor vehicle seating assembly of FIG. 1 in accordance with the present disclosure, wherein the lower seating assembly of the motor vehicle seating assembly is pivoted forward to the stowed position to expose the interior of the storage bin of FIG. 4, and the seatback assembly is in the upright position.

Referring to FIGS. 1-3, reference numeral 10 generally designates a motor vehicle seating assembly for use in a motor vehicle (not shown). The motor vehicle seating assembly 10 in accordance the present disclosure is particularly suited for application to second and rearward seating row positions. The motor vehicle seating assembly 10 generally comprises a lower seating assembly 12 and a seatback assembly 14 normally projecting upwardly therefrom. Preferably, the lower seating assembly 12 and the seatback assembly 14 are separated into two distinct motor vehicle seating assemblies, a first motor vehicle seating assembly 10A representing approximately 40% of the width of the motor vehicle seating assembly 10 and the second motor vehicle seating assembly 10B representing approximately 60% of the width the motor vehicle seating assembly 10. In the preferred embodiment, the lower seating assembly 12 has an exposed upper surface 16 and a lower surface 18. As is known, the lower seating assembly 12 generally consists of a foam cushion and trim cover assembly 20 supported by a cushion pan 22 upon which a motor vehicle occupant can be supported. The cushion pan 22 thereby defines the lower surface 20. The lower seating assembly 12 is preferably pivotally mounted at a forward edge 24 thereof to a floor pan 26 disposed below the lower seating assembly 12 via a mounting bracket 28. The mounting bracket 28 preferably comprises an upper pivot bracket 30, a lower pivot bracket 32, and a pivot 34 as, for example, shown in FIGS. 3 and 8. The lower seating assembly 12 is thereby pivotable between a design position, as shown in FIG. 1, and a stowed position, as shown in FIG. 2. When in the "flip-forward" or stowed position, the lower seating assembly 12 of each of the 40% or 60% seating assemblies 10A, 10B assumes a substantially vertical orientation and flips forward around the pivot 34 at the forward edge 24 of the lower seating assembly 12.

The seatback assembly 14 is pivotably mounted to a rear riser 36 affixed to the floor pan 26 proximate a rearward edge 38 of the lower seating assembly 12, when the lower seating assembly 12 is in the design position. The seatback assembly 14 preferably includes one or more head restraints 40 and an exposed forward surface 42 that likewise generally consists of a foam cushion and trim cover assembly 44 that supports the back of a motor vehicle occupant. The seatback assembly 14 also includes an exposed rearward surface 46. The rear riser 36 includes a lower seating assembly latch 48 that engages the rearward edge 38 of the lower seating assembly 12 when the lower seating assembly 12 is in the design position. When it is desired to move the lower seating assembly 12 to the stowed position, the lower seating assembly latch 48 is released, whereupon the lower seating assembly 12 may be rotated or "flipped" forward to expose the floor pan 26 below. Further, as is known, the seatback assembly 14 can be released to pivot forward, whereupon the exposed forward surface 42 of the seatback assembly 14 faces the floor pan 26 and the exposed surface 46 of the seatback assembly 14 faces upwardly. Particularly in the case where a carpeted cargo area 50 is situated behind the motor vehicle seating assembly 10, the exposed rearward surface 46 of the seatback assembly 14 may be, for example, covered by a matching carpet to provide a substantially continuous and enlarged cargo area.

As shown in FIG. 3, the lower surface 18 of the cushion pan 22 of the lower seating assembly 12 is displaced above the floor pan 26. The mounting bracket 28 operably couples the forward edge 24 of the lower seating assembly 12 to the floor pan 26. An antisubmarine bracket 52 is attached with fasteners 54 through the mounting bracket 28 to the floor pan 26. Optionally, a spacer 60 can be disposed between the antisubmarine bracket 52 and the floor pan 26 and about the fastener 54 to provide the appropriate geometry for the mounting bracket 28. The antisubmarine bracket 52 creates an antisubmarine load reaction surface 56, whereupon in the event of a frontal impact event, the load imparted by the occupant upon the lower seating assembly 12 is restrained and directed toward the floor pan 26. The antisubmarine load reaction surface 56 preferably comprises a reinforcement brace 58 fabricated as a substantially elongated metal strip. The reinforcement brace 58 integrally molded into the antisubmarine bracket 52 is a substantially rectangular, injection-molded single-piece structure which is, in turn, fabricated of expanded polypropylene that substantially encapsulates the reinforcement brace 58.

The mounting bracket 28 of the lower seating assembly 12 further comprises the upper pivot bracket 30 operably coupled to the forward edge 24 of the cushion pan 22 that forms the lower surface 18 of the lower seating assembly 12. The mounting bracket 28 further comprises the lower pivot bracket 32 operably coupled with the reinforcement brace 58 by which the lower seating assembly 12 is mounted to the floor pan 26. As shown in FIG. 3, when the lower seating assembly 12 is in the design position, wasted space exists beneath the lower seating assembly 12. This leaves a void or volume between the lower surface 18 of the cushion pan 22 of the lower seating assembly 12 and the floor pan 26.

In accordance with the present disclosure, a storage bin 64 is preferably disposed between the lower surface 18 of the cushion pan 22 of the lower seating assembly 12 and the floor pan 26. Preferably, the storage bin 64 comprises a horizontally disposed frame member 66 disposed between the lower surface 18 of the cushion pan 22 of the lower seating assembly 12 and the floor pan 26, wherein the storage bin, the floor pan 26, and lower surface 18 of the cushion pan 22 of the lower seating assembly 12 define an enclosure below the lower seating assembly 12. The storage bin 64 is likewise preferably injection molded as a single-piece structure fabricated of expanded polypropylene.

The storage bin 64 is preferably shaped in a substantially rectangular "window frame" configuration that substantially fills the volume between the lower surface 18 of the cushion pan 22 of the lower seating assembly 12 and the floor pan 26 to create a storage enclosure 68. As is known, the floor pan 26 is often configured into a relatively complex structure having an undulating and irregular surface. Accordingly, the storage bin 64 preferably comprises vertically extending sides 70 having a lower edge 72 that conforms to the undulating shape of the floor pan 26 and defines a lower periphery 74. The vertically extending sides also have an upper edge 76 that conforms to the lower surface 18 of the cushion pan 22 of the lower seating assembly 12 and define an upper periphery 78. Since the lower surface 18 of the cushion pan 22 of the lower seating assembly 12 and the floor pan 26 are displaced one from another at irregular distances about the lower periphery 74 and the upper periphery 78, the vertically extending sides 70 of the storage bin 64 substantially enclose the interior of the storage bin 64 when the lower seating assembly 12 is in the design position. The storage bin 64 comprises a lower opening 80 and an upper opening 82, and thereby encloses the volume between the lower surface 18 of the cushion pan 22 of the lower seating assembly 12 and the floor pan 26. Preferably, the frame member 66 thus comprises two laterally opposed sides 84, 86 contoured to an underbody profile of the floor pan 26 to conform with the floor pan 26.

Preferably, a forward edge 88 of the storage bin 64 is formed about and encapsulates the reinforcement brace 58, which then acts as the antisubmarine load reaction surface 56. The forward edge 88 of the storage bin 64 is similarly attached to the floor pan 26. The rearward edge 90 of the storage bin 64 is preferably provided with a lip 92 that, when installed, creates an interference fit with a forward portion 94 of the rear riser 36 to secure the storage bin 64 in situ. Preferably, the rearward edge 90 is provided with recesses 96 within which the lip 92 is situated to further enhance the interference with the forward portion 94 of the rear riser 36. The two side edges 84, 86 of the storage bin 64 preferably conform with and follow the profile of the floor pan 26 to create a seal with the floor pan 26. When the lower seating assembly 12 is folded back in the design position, the lower seating assembly 12 will then act as a lid for the storage bin 64.

An additional aspect of the present disclosure is that the seatback assembly 14 is pivotable between an upright design position and a forward stowed position. As noted above, the seatback assembly 14 has an exposed forward surface 42 and an exposed rearward surface 46. Thus, when the lower seating assembly 12 is in the stowed position and when the seatback assembly 14 is in the forward stowed position, the seatback assembly 14 may also serve as the lid for the storage bin 64, to thereby define an enclosure within the storage bin 64 between the exposed forward surface 42 of the seatback assembly 14 and the floor pan 26.

In accordance with the present disclosure, the front screw 54 provides attachment of the integrated antisubmarine load reaction surface 56, behind which is situated a storage space. The storage bin 64 is also held in place by a forward portion 94 of the rear riser 36 by an interference fit between lip 92 and the forward portion 94 of the rear riser 36. The storage bin 64 thus transforms wasted volume to useful storage for stowing small items, such as a flashlight, jumper cables, road flares, and the like. The storage bin 64 of the present disclosure is particularly well-suited for retrofitting existing motor vehicle seating assemblies 10 without changing the design of the existing motor vehicle seating assemblies 10. Rather, only the single-piece injection molded storage bin 64 need be modified to function as described herein.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly comprising:
   a lower seating assembly having a lower surface displaced above a floor pan;
   a mounting bracket operably coupling a forward edge of the lower seating assembly to the floor pan; and
   a storage bin comprising a horizontally disposed substantially rectangular frame member having an upper opening and a lower opening defined by vertically extending sides that have a lower edge that conforms to the floor pan and defines a lower periphery and an upper edge that conforms to the lower surface of the lower seating assembly and defines an upper periphery, wherein the frame member substantially fills a volume between the lower surface of the cushion pan of the lower seating assembly and the floor pan, and is disposed between the lower surface and the floor pan, and wherein the storage bin, the floor pan, and the lower surface of the lower seating assembly define an enclosure below the lower seating assembly.

2. The seating assembly of claim 1, wherein the storage bin comprises vertically extending sides that have a lower edge that conforms to the floor pan and define a lower periphery and that have an upper edge that conforms to the lower surface of the lower seating assembly and define an upper periphery.

3. The seating assembly of claim 2, wherein the storage bin comprises a lower opening and an upper opening and forms an enclosure within a volume between the lower surface of the lower seating assembly and the floor pan.

4. The seating assembly of claim 3, wherein the frame member comprises two laterally opposed sides contoured to an underbody profile of the floor pan to conform with the floor pan.

5. The seating assembly of claim 4, wherein the lower seating assembly has a design position and a stowed position, the lower seating assembly forming a lid for the storage bin when in the design position.

6. The seating assembly of claim 3, wherein the frame member comprises an expanded polypropylene injection molded single-piece structure having a front edge further comprising an antisubmarine load reaction surface.

7. A seating assembly comprising a lower seating assembly having a design position and a stowed position mounted to a floor pan of a motor vehicle, the lower seating assembly further comprising:
   an upper exposed surface and a lower surface, the lower surface being displaced above the floor pan when in the design position;
   a mounting bracket operably coupled to the floor pan and pivotally attached to a forward edge of the lower seating assembly, whereby the lower seating assembly is pivotable about the mounting bracket between the design position and the stowed position; and
   a storage bin fabricated as an expanded polypropylene injection molded single-piece structure disposed between the lower surface of the lower seating assembly and the floor pan, the storage bin comprising a horizontally disposed frame member having vertically extending sides that have a lower edge that conforms to the floor pan and define a lower periphery and that have an upper edge that conforms to the lower surface of the lower seating assembly and define an upper periphery, wherein the storage bin, the floor pan, and the lower surface of the lower seating assembly define an enclosure below the lower seating assembly when the lower seating assembly is in the design position, and wherein a forward edge of a portion of the vertical sides of the storage bin comprises an antisubmarine reaction surface.

8. The seating assembly of claim 7, wherein the antisubmarine load reaction surface comprises a reinforcement brace comprising a substantially elongated metal strip integrally molded into the injection molded single-piece structure.

9. The seating assembly of claim 8, wherein the mounting bracket further comprises an upper pivot bracket operably coupled to a forward edge of the lower surface of the lower seating assembly and the mounting bracket further comprises a lower pivot bracket operably coupled with the reinforcement brace by which the lower seating assembly is mounted to the floor pan.

10. The seating assembly of claim 7, wherein the storage bin defines a substantially rectangular enclosure within an interior of the storage bin between the lower surface of the lower seating assembly and the floor pan when the lower seating assembly is in the design position.

11. The seating assembly of claim 10, wherein the lower surface of the lower seating assembly and the floor pan are displaced one from another at irregular distances between the lower periphery and the upper periphery, and the sides of the storage bin substantially enclose the interior of the storage bin when the lower seating assembly is in the design position.

12. The seating assembly of claim 7, wherein a rearward edge of the storage bin defines an interference fit with a seatback mounting bracket.

13. The seating assembly of claim 7, wherein the anti-submarine reaction surface comprises a reinforcement brace fabricated as a substantially elongated metal strip integrally molded into the injection molded single-piece structure.

14. The seating assembly of claim 13, wherein the lower seating assembly further comprises an upper pivot bracket operably coupled to a forward edge of the lower surface of the lower seating assembly and a lower pivot bracket operably coupled with the reinforcement brace by which the lower seating assembly is mounted to the floor pan.

15. The seating assembly of claim 7, wherein the seating assembly comprises a second row seating assembly.

16. The seating assembly of claim 15, wherein the seating assembly further comprises a seatback pivotable between an upright design position and a forward stowed position and having a forward exposed surface and a rearward exposed surface, and wherein the storage bin defines an enclosure within the storage bin between the floor pan and the exposed surface of the seatback when the seatback is in the forward stowed position and when the lower seating assembly is in the stowed position.

17. A storage bin disposed between a lower surface of a lower seating assembly and a floor pan of a motor vehicle, the storage bin comprising a horizontally disposed frame member having vertically extending sides that have a lower edge that conforms to the floor pan and define a lower periphery and that has an upper edge that conforms to the lower surface of the lower seating assembly and define an upper periphery, wherein the storage bin, the floor pan, and the lower surface of the lower seating assembly define an enclosure below the lower seating assembly when the lower seating assembly is in a design position, and wherein the lower seating assembly further comprises a mounting bracket operably coupled to the floor pan and pivotally attached to a forward edge of the lower seating assembly, whereby the lower seating assembly is pivotable about the mounting bracket between the design position and a stowed position and the mounting bracket comprises a substantially elongated metal strip integrally molded into the storage bin.

* * * * *